J. P. ALLEN.
Car Wheel.
No. 89,003.
Patented April 20, 1869.
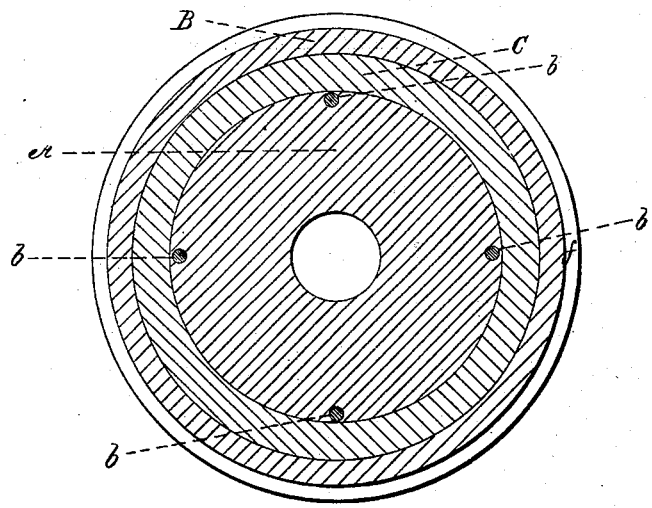
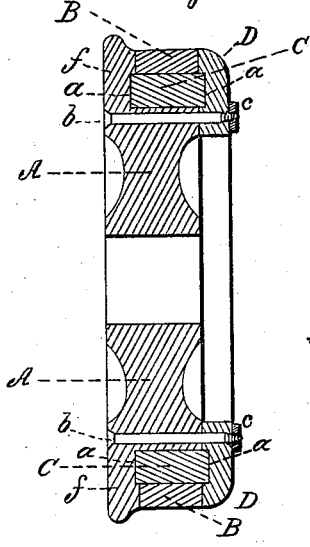
Witnesses.
S. N. Piper.
L. N. Moller.
John P Allen
by his attorney
R. H. Eddy

JOHN P. ALLEN, OF MANCHESTER, MASSACHUSETTS.

Letters Patent No. 89,003, dated April 20, 1869.

IMPROVED RAILWAY-CARRIAGE WHEEL.

The Schedule referred to in these Letters Patent and making part of the same.

*To all persons to whom these presents may come:*

Be it known that I, JOHN P. ALLEN, of Manchester, in the county of Essex, and State of Massachusetts, have invented a new and useful Improvement in Railway-Carriage Wheels; and I do hereby declare the same to be fully described in the following specification, and represented in the accompanying drawings, of which—

Figure 1 is a longitudinal section, and

Figure 2, a transverse section of a railway-carriage wheel provided with my invention.

My invention has reference to those wheels which have, between their metallic tire and body, an annulus of India rubber, arranged concentrically to the tire and the circumference of the body, the nature of my said improvement consisting in the insertion of the edges of the elastic ring in annular pockets or grooves made in the flange and the cap-plate, and projecting beyond the tire, separate from the flange and cap-plate, and fitting to and encompassing the elastic ring, the whole being as hereinafter explained.

Without the annular pockets, the elastic ring is liable to become worn and injured on its opposite sides, by reason of the action of dust, and the friction of such edges against their next adjacent surfaces.

The annular grooves or pockets operate to prevent the introduction of dust between the edges of the elastic ring and the next adjacent metallic surfaces; and they are advantageous in other respects, as, with them, the elastic ring will not only operate to better advantage, but will last very much longer than without them.

In the drawings—

A denotes the body of the wheel;

B, the metallic tire;

C, the elastic annulus;

D, the cap-ring or plate; and $a\ a$, the annular grooves or pockets made in such plate or ring, and in the flange $f$, and so as to go around the entire wheel.

The cap-ring or plate D is secured to the body A by screw-bolts $b$ and nuts $c$, the bolts going through such body.

The elastic ring C is wider than the circumference of the body-part of the wheel, so as to project into and fill the annular pockets, when the cap D is fastened in place on the body.

The tire B is separate from the flange $f$ and the cap D, and encompasses and fits to the elastic annulus C, which projects beyond it, in opposite directions, into the pockets $a\ a$ in the parts $f$ and D.

The purpose of the elastic annulus is to prevent the tire from being stretched while in use, as it would be likely to be were it supported on an inelastic surface.

The elastic annulus also serves to prevent noise as well as injury to the carriage and wheel, such as usually results from the passage of the wheel over the joints of the rails of a railway.

I make no claim to the combination of an elastic annulus with the inelastic body and tire of a wheel, the three being arranged concentrically with each other, and the inelastic annulus being placed between the body and the tire.

I am aware of the wheel shown in fig. 2 of the drawings of the United States patent, No. 8,526, granted to N. Hodge, November 18, 1851. In this wheel, the elastic material, or vulcanized India rubber, is arranged in concentric grooves formed in the body of the wheel, and an encompassing-annulus, on and about which the tire is fixed. Such wheel has no cap-ring or plate applied against its sides, and also against its tire and the elastic material, as is the case in my wheel. Nor are the tire and the elastic ring or material arranged concentrically and in contact, and held in place against a common flange by the cap-ring, as they are in my wheel, and, consequently, there are no pockets in such a flange and cap as exist in my wheel.

I claim, in a wheel provided with an inelastic body and tire, and an elastic annulus disposed between and concentric with the two, as set forth, the combination and arrangement of the annular pockets or grooves $a\ a$ with the cap D and flange $f$, and with a tire, B, separate from the flange $f$ and cap D, and made so as to encompass and fit directly to the elastic annulus C, and with the elastic annulus C extended into such pockets or grooves, in manner as specified.

JOHN P. ALLEN.

Witnesses:
R. H. EDDY,
F. P. HALE, Jr.